(12) United States Patent
Kiwan et al.

(10) Patent No.: US 10,941,703 B2
(45) Date of Patent: Mar. 9, 2021

(54) METHOD AND SYSTEM FOR APPLYING ENGINE KNOCK WINDOWS

(71) Applicant: Ford Global Technologies, LLC, Dearborn, MI (US)

(72) Inventors: Rani Kiwan, Ann Arbor, MI (US); Mohannad Hakeem, Dearborn, MI (US); Christopher Paul Glugla, Macomb, MI (US); James Matthew Kindree, South Lyon, MI (US); Amey Karnik, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 16/170,869

(22) Filed: Oct. 25, 2018

(65) Prior Publication Data
US 2020/0131988 A1 Apr. 30, 2020

(51) Int. Cl.
| | | |
|---|---|---|
| F02B 77/08 | (2006.01) |
| F02D 35/02 | (2006.01) |
| F02D 13/02 | (2006.01) |
| F02D 13/06 | (2006.01) |
| F02D 41/00 | (2006.01) |
| G01L 23/22 | (2006.01) |
| F02P 5/152 | (2006.01) |

(52) U.S. Cl.
CPC ........ *F02B 77/085* (2013.01); *F02D 13/0215* (2013.01); *F02D 13/06* (2013.01); *F02D 35/027* (2013.01); *F02D 41/0087* (2013.01); *F02P 5/152* (2013.01); *G01L 23/22* (2013.01); *G01L 23/221* (2013.01); *F02D 2200/025* (2013.01)

(58) Field of Classification Search
CPC . G01L 23/22; G01L 23/221; F02D 2200/025; F02D 17/02; F02D 35/027; F02D 13/0215; F02D 13/06; F02D 41/2461; F02D 41/30; F02D 401/0087; F02B 77/085; F01L 2013/001; F02P 5/152; F02P 5/045; F02P 5/1521; F02P 5/1522; F02P 5/1525
USPC .......... 123/90.15, 90.16, 90.17, 480, 406.16, 123/406.29; 701/111
See application file for complete search history.

(56) References Cited

U.S. PATENT DOCUMENTS

| | | | |
|---|---|---|---|
| 9,759,145 B2 | 9/2017 | Glugla et al. | |
| 10,267,256 B1* | 4/2019 | Dudar | F02D 41/0087 |
| 2011/0265453 A1* | 11/2011 | Uhrich | F02D 17/02 |
| | | | 60/274 |
| 2011/0265771 A1* | 11/2011 | Banker | F02D 41/0087 |
| | | | 123/564 |

(Continued)

OTHER PUBLICATIONS

Hakeem, M. et al., "Method and System for Variable Displacement Engine Knock Control," U.S. Appl. No. 15/985,257, filed May 21, 2018, 77 pages.

(Continued)

*Primary Examiner* — Devon C Kramer
*Assistant Examiner* — Kelsey L Stanek
(74) *Attorney, Agent, or Firm* — Geoffrey Brumbaugh; McCoy Russell LLP

(57) ABSTRACT

Methods and systems are disclosed for operating an engine that includes a knock control system that may determine contributions of individual noise sources to an engine background noise level. The contributions of the individual noise sources may be the basis for establishing the presence or absence of knock in one or more engine cylinders.

14 Claims, 10 Drawing Sheets

(56) References Cited

U.S. PATENT DOCUMENTS

2017/0089284 A1* 3/2017 Miura .................... F01N 3/20
2017/0356369 A1* 12/2017 Doering .............. F02D 41/1406
2018/0363578 A1* 12/2018 Glugla ................ F02D 41/0087

OTHER PUBLICATIONS

Hakeem, M. et al., "Method and System for Adjusting Engine Knock Background Noise of a Variable Displacement Engine," U.S. Appl. No. 15/985,337, filed May 21, 2018, 75 pages.
Hakeem, M. et al., "Method and System for Adjusting Engine Knock Background Noise Levels," U.S. Appl. No. 15/985,428, filed May 21, 2018, 93 pages.
Kiwan, R. et al., "Method and System for Learning Contributions to an Engine Knock Background Noise Level," U.S. Appl. No. 16/122,065, filed Sep. 5, 2018, 49 pages.
Glugla, C. et al., "Method and System for Determining Piston Slap," U.S. Appl. No. 16/129,562, filed Sep. 12, 2018, 46 pages.
Glugla, C. et al., "Method and System for Determining Engine Knock Background Noise Levels," U.S. Appl. No. 16/144,762, filed Sep. 27, 2018, 56 pages.
Glugla, C. et al., "Method and System for Detecting Engine Knock During Transient Conditions," U.S. Appl. No. 16/155,394, filed Oct. 9, 2018, 48 pages.
Kiwan, R. et al., "Method and System for Engine Knock Detection," U.S. Appl. No. 16/171,247, filed Oct. 25, 2018, 52 pages.
Kiwan, R. et al., "Method and System for Learning Contributions of Engine Knock Background Noise for a Variable Displacement Engine," U.S. Appl. No. 16/195,695, filed Nov. 19, 2018, 75 pages.

\* cited by examiner

METHOD AND SYSTEM FOR APPLYING ENGINE KNOCK WINDOWS

FIELD

The present application relates to methods and systems for learning and establishing contributions of different engine noise sources to an engine knock background noise level.

BACKGROUND/SUMMARY

An engine may include a knock window for generating an engine knock background noise level and assessing the presence or absence of engine knock. The engine knock background noise level provides a basis for judging whether or not engine knock is present. The engine knock background noise may include noise from engine bearings, poppet valve opening and closing events, cam rotation, crankshaft rotation, fuel injectors opening and closing, and other sources. The noise sources may cause the engine's block to vibrate, but the engine knock background noise level may change with engine operating conditions. For example, the engine knock background noise level for a particular cylinder may be at one level when the fuel injectors are new and at a second level after the engine has operated for a predetermined duration of time. Similarly, the engine's poppet valves may increase engine knock background noise at times when the poppet valves open and close. Further, the noise generated by poppet valve opening and closing may also change as an engine ages. A change in engine knock background noise levels due to fuel injectors or poppet valves may cause engine knock to be missed or falsely indicated. Therefore, it may be desirable to provide a way of determining engine knock background noise levels as an engine ages or when indications of engine knock deviate from norms.

The inventors herein have developed an engine operating method, comprising: ceasing to supply fuel to a first engine cylinder via a controller; adjusting open timing of a knock window of the first engine cylinder to span a timing of a closing of a device of a second cylinder via the controller while fuel delivery to the first engine cylinder is ceased; and sampling output of a knock sensor during the knock window via the controller.

By adjusting open time of a knock window of a first cylinder that is deactivated to span or cover a timing of a closing of a device of a second cylinder, it may be possible to provide the technical result of learning engine knock background noise levels via a knock window of a deactivated cylinder so that knock control of an activated cylinder may be uninterrupted. For example, if cylinder number two of an eight cylinder engine is deactivated, a timing of an opening duration (e.g., a crankshaft angular interval) of a knock window that is associated with cylinder number two may be adjusted to be open when a fuel injector of cylinder number one is closed so that a fuel injection noise contribution of a total engine knock background noise level may be determined for an engine knock background noise level of a cylinder that may be affected by noise from closing the fuel injector of cylinder number one. Thus, an unapplied cylinder knock window that results from deactivating a cylinder may be applied in an alternative way that allows a noise contribution of a total engine knock background noise level of a cylinder to be determined even though the timing of the noise contribution falls out of a knock window that may include the noise contribution during other engine operating conditions. This may allow engine knock background noise levels to be relearned as the engine ages so that engine knock control may be robust throughout the engine's life cycle.

The present description may provide several advantages. In particular, the approach may improve detection of engine knock. Further, the approach may improve the efficiency at which engine knock background noise levels may be learned. Further still, the approach may provide ways of determining engine knock background noise levels for engine operating conditions where the engine has not operated or where the engine does not operate frequently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
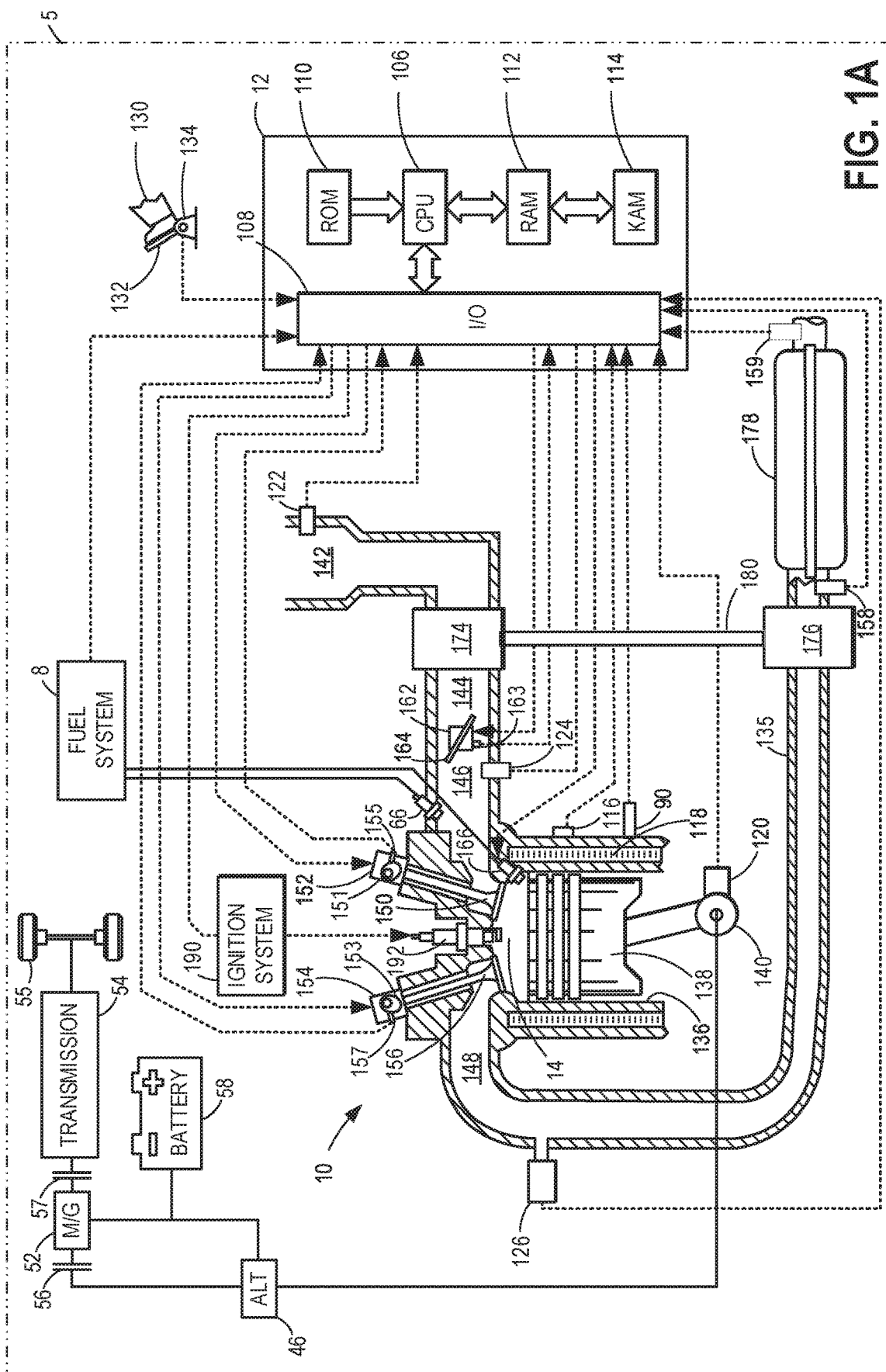
FIG. 1A shows a schematic depiction of an engine system of a vehicle.
Figure 1C:
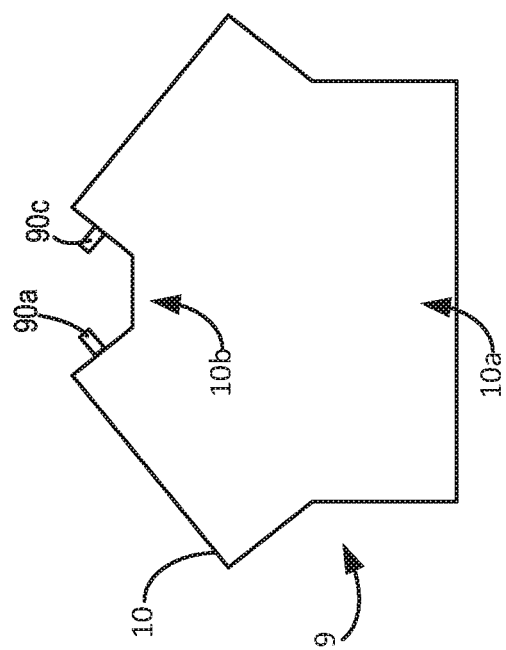
FIG. 1C shows an alternative view of knock sensor locations for the V8 engine.
Figure 1B:
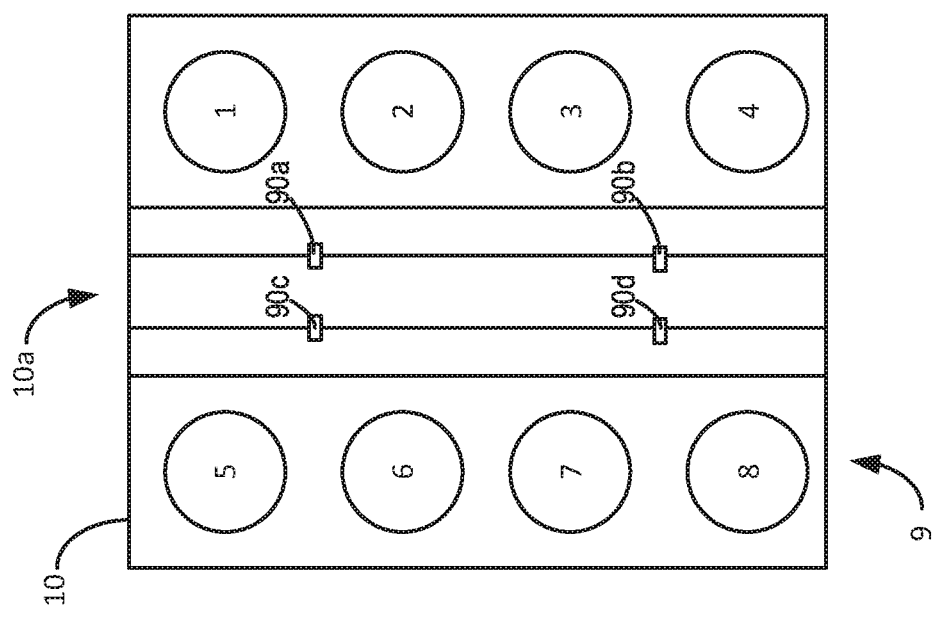
FIG. 1B shows example locations for knock sensors for a V8 engine.
Figure 2:
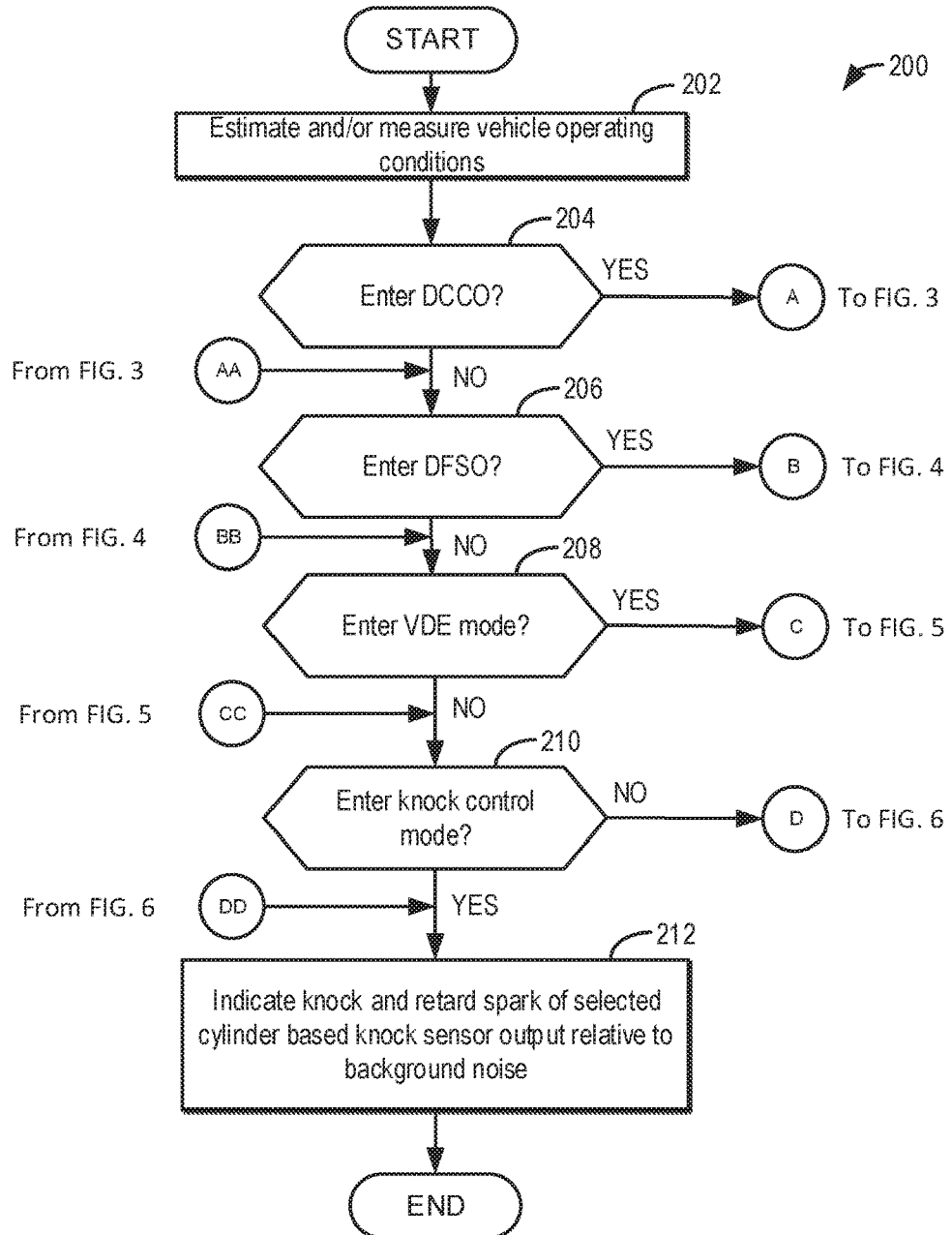
FIGS. 2-6 shows a high level flow chart of a way to operate an engine that includes a knock control system.
Figure 7:
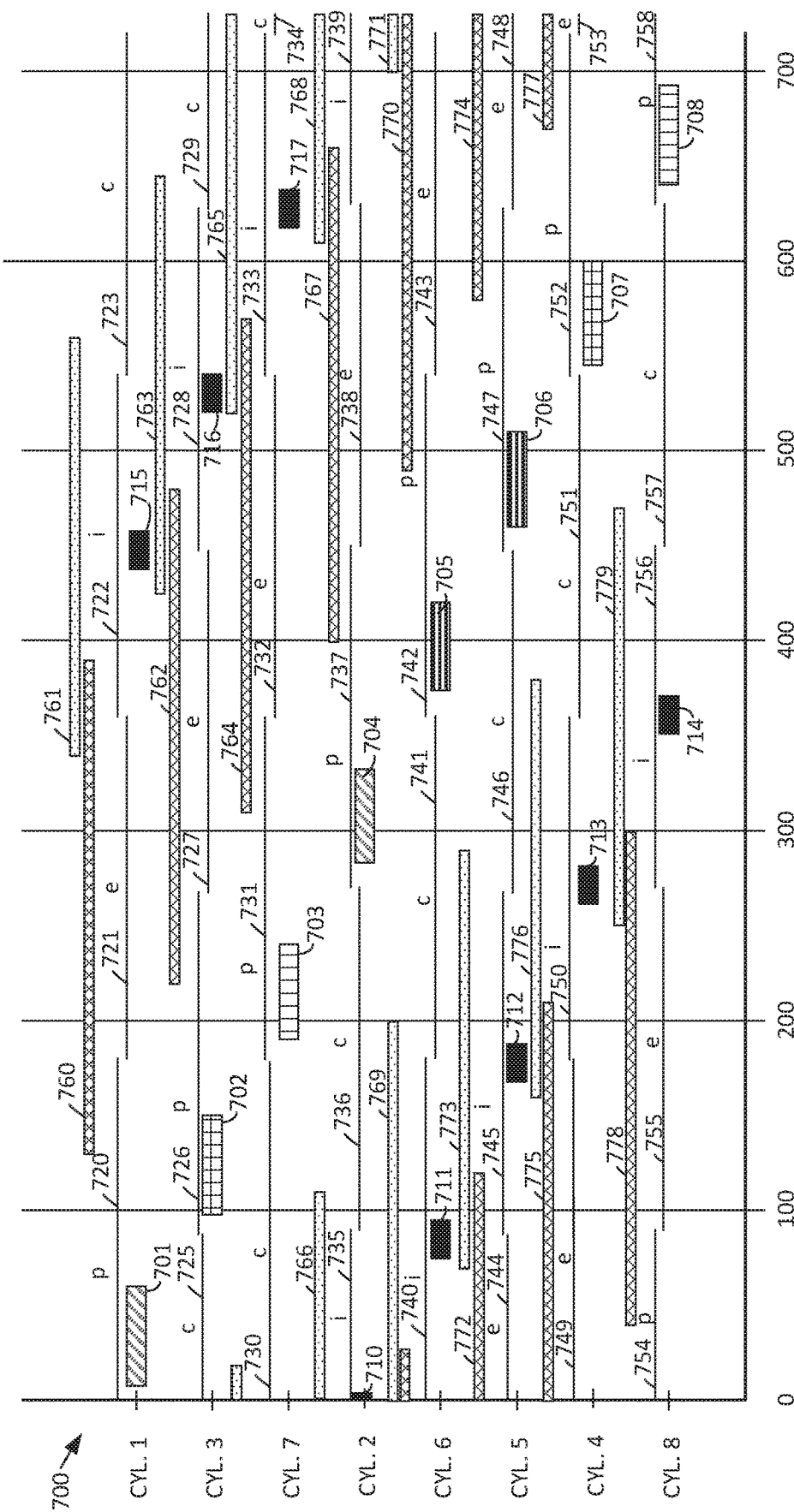
FIGS. 7-9 show example engine operating sequences for illustrating the method of FIGS. 2-6.
Figure 8:
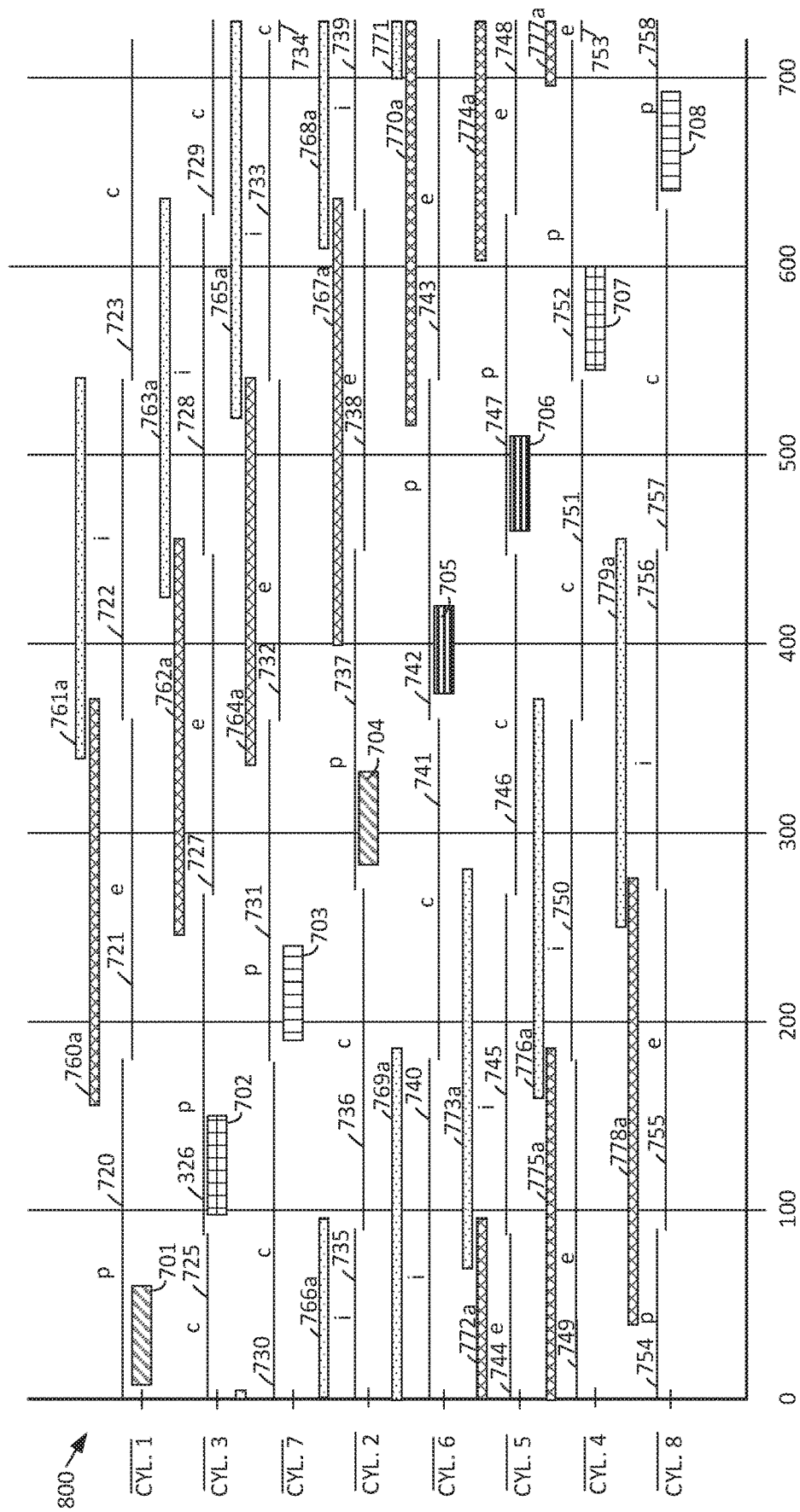
Figure 9:
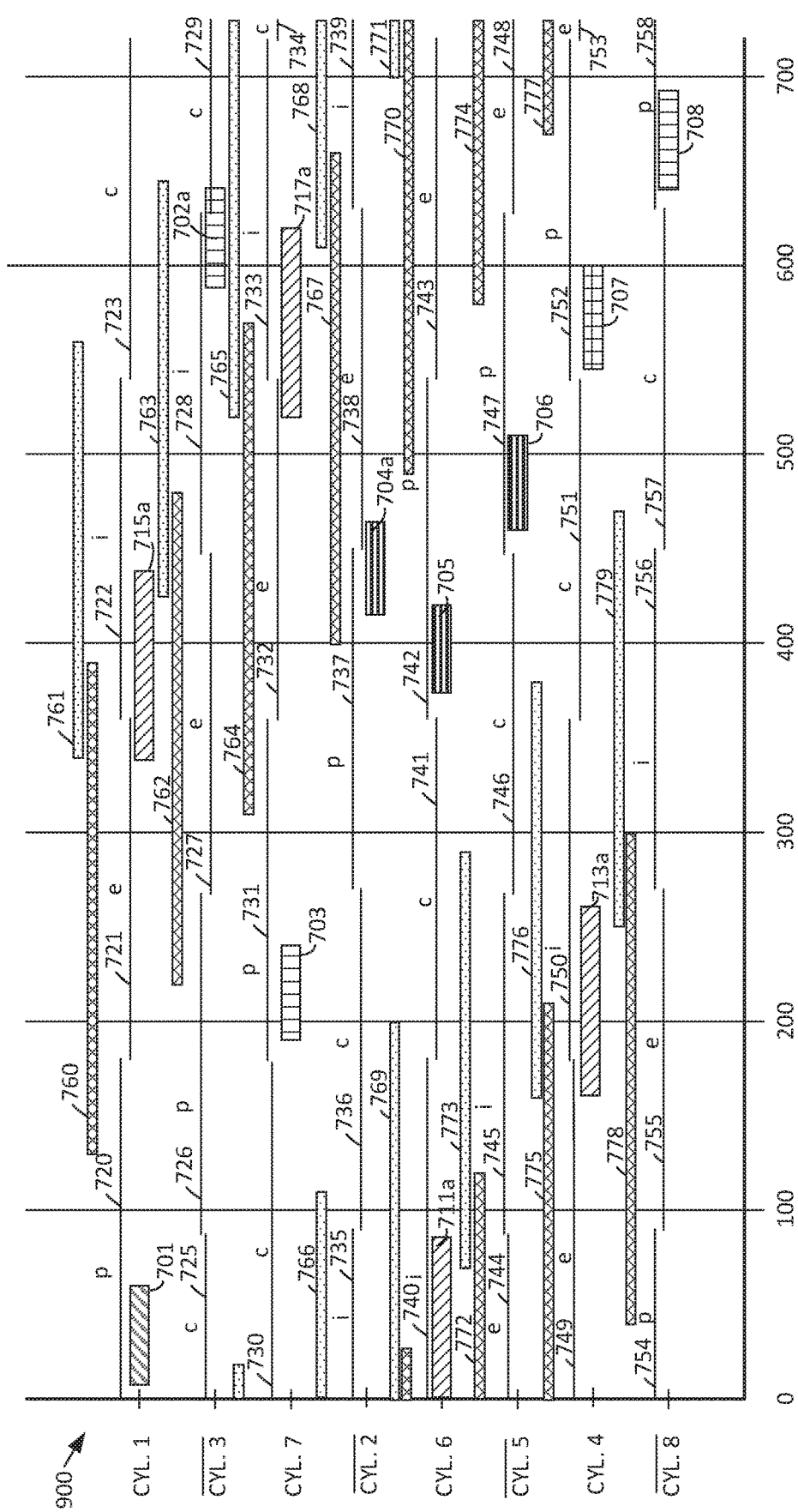

The following description relates to systems and methods for operating an engine that includes a knock control system. The engine may be of the type that is shown in FIGS. 1A-1C. The engine may be operated according to the method of FIGS. 2-6. The method may learn engine background noise levels via engine knock windows of deactivated cylinders so that there may be fewer effects on engine operation. The method may perform as shown in the sequences of FIGS. 7-9.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. The controller 12 receives signals from the various sensors shown in FIGS. 1A-1C. In addition, controller 12 employs the actuators shown in FIGS. 1A-1C to adjust engine operation based on the received signals and instructions stored in memory of controller 12. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown)

may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows (e.g., crankshaft angular intervals) of engine cylinders one and two. Thus, knock sensor 90a is associated with cylinders one and two. However, if knock sensor 90a (the primary knock sensor of cylinder numbers one and two) is suspected of being degraded, output of knock sensor 90b (the secondary knock sensor of cylinder numbers one and two) may be sampled or measured in knock windows associated with engine cylinder numbers one and two. Output of knock sensor 90b is sampled via controller 12 during the knock windows of engine cylinders three and four. However, if knock sensor 90b (the primary knock sensor of cylinder numbers three and four) is suspected of being degraded, output of knock sensor 90a (the secondary knock sensor of cylinder numbers three and four) may be sampled or measured in knock windows associated with engine cylinder numbers three and four. Thus, knock sensor 90b is associated with cylinders three and four. Output of knock sensor 90c is sampled via controller 12 during the knock windows of engine cylinders five and six. Thus, knock sensor 90c is associated with cylinders five and six. However, if knock sensor 90c (the primary knock sensor of cylinder numbers five and six) is suspected of being degraded, output of knock sensor 90d (the secondary knock sensor of cylinder numbers five and six) may be sampled or measured in knock windows associated with engine cylinder numbers five and six. Output of knock sensor 90d is sampled via controller 12 during the knock windows of engine cylinders 7 and 8. Thus, knock sensor 90d is associated with cylinders seven and eight. However, if knock sensor 90d (the primary knock sensor of cylinder numbers seven and eight) is suspected of being degraded, output of knock sensor 90c (the secondary knock sensor of cylinder numbers seven and eight) may be sampled or measured in knock windows associated with engine cylinder numbers seven and eight. The plurality of knock sensors improves the ability to detect knock for each cylinder since attenuation of engine vibrations from knock increases as the distance from the knocking cylinder to the knock sensor increases. Knock sensor output is not sampled when the knock windows are closed.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: a variable displacement engine including at least one vibration sensing engine knock sensor; and a controller including executable instructions stored in non-transitory memory to sample output of a first engine knock sensor during opening of a first knock window of a first cylinder when the first cylinder is activated, and sampling output of a second engine knock sensor during opening of a second knock window of the first cylinder when the first cylinder is deactivated. The system further comprises additional instructions to adjusting timing of the second knock window. The system includes where adjusting timing of the second knock window includes adjusting an open time of the second knock window to span an event associated with a second cylinder. The system includes where the event associated with the second cylinder is a poppet valve opening or closing. The system includes where the event associated with the second cylinder is a fuel injector opening or closing. The system further comprises additional instructions to generate an engine knock background noise level from sampling output of the first engine knock sensor.

Referring now to FIGS. 2-6, a method for operating an engine is shown. The method of FIGS. 2-6 may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs. The engine may be rotating while method 200 is performed. The method of FIGS. 2-6 may provide the sequences of FIGS. 7-9.

At 202, method 200 determines vehicle and engine operating conditions via the sensors described in FIG. 1A-1C. Method 200 may determine operating conditions including but not limited to engine speed, engine load, engine temperature, ambient temperature, fuel injection timing, knock sensor output, fuel type, fuel octane, engine position, and engine air flow. Method 200 proceeds to 204.

At 204, method 200 judges if conditions are met for entering deceleration cylinder cutout (DCCO). During DCCO, fuel delivery to the engine is ceased and intake and exhaust poppet valves of the engine are closed and held closed for at least an engine cycle (e.g., two crankshaft revolutions). By ceasing fuel delivery to the cylinders, engine fuel consumption may be reduced. In addition, closing the intake and exhaust poppet valves prevents air from being pumped through the engine and upsetting a chemical balance in the catalyst. In one example, method 200 may judge that the engine may enter DCCO when driver demand torque is less than a threshold torque and when vehicle speed is greater than a threshold vehicle speed. However, the engine may enter DCCO during other vehicle operating conditions. Further, other conditions may have to be met to enter DCCO mode. For example, engine coolant temperature may have to be greater than a predetermined temperature to enter DCCO mode. If method 200 judges that conditions are met for entering DCCO mode, the answer is yes and method 200 proceeds to 220. DCCO mode may be requested when the answer is yes. Otherwise, the answer is no and method 200 proceeds to 206.

At 206, method 200 judges if conditions are met for entering deceleration fuel shut off (DFSO). During DFSO, fuel delivery to the engine is ceased and intake and exhaust poppet valves of the engine continue to open and close as the engine rotates. By ceasing fuel delivery to the cylinders, engine fuel consumption may be reduced. In addition, allowing the intake and exhaust valves to continue to open and close allows pressure to be maintained in engine cylinders to lower engine oil consumption. In one example, method 200 may judge that the engine may enter DFSO when driver demand torque is less than a threshold torque and when vehicle speed is greater than a threshold vehicle speed. However, the engine may enter DFSO during other vehicle operating conditions. Further, other conditions may have to be met to enter DFSO mode. For example, engine coolant temperature may have to be greater than a predetermined temperature to enter DFSO mode. If method 200 judges that conditions are met for entering DFSO mode, the answer is yes and method 200 proceeds to 240. DFSO mode may be requested when the answer is yes. Otherwise, the answer is no and method 200 proceeds to 208.

At 208, method 200 judges if conditions are met for entering a variable displacement mode where the engine is operated with fewer than all of its cylinders. For example, the engine may operate in a VDE mode where the number of activated cylinders (e.g., cylinders that are combusting fuel) is adjusted according to or based on a driver demand torque and engine speed. Further, the cylinders that are active may be a same group of cylinders (e.g., 1-4-6-7) that does not change when engaged in a particular variable displacement engine (VDE) mode while engine speed and load are constant, which may be referred to as stationary VDE mode. Alternatively, the cylinders that are active may be a group of cylinders in which the cylinder numbers change from engine cycle to engine cycle when engine speed and load are constant (e.g., cylinders 1-4-6-7 during a first engine cycle and cylinders 2-4-5-8 during a second engine cycle), which may be referred to as rolling VDE. In one example, method 200 may judge that the engine may enter a VDE mode when driver demand torque is within a prescribed range and engine speed is within a prescribed range. Further, other conditions may have to be met to enter VDE mode. For example, engine coolant temperature may have to be greater than a predetermined temperature. If method 200 judges that conditions are met for entering VDE mode, the answer is yes and method 200 proceeds to 260. VDE mode may be requested when the answer is yes. Otherwise, the answer is no and method 200 proceeds to 210.

At 210, method 200 judges if conditions are met for entering an engine knock control mode where the engine may operate with a small amount of engine knock to improve efficiency and where the level of engine knock is controlled to reduce the possibility of engine component degradation. In one example, method 200 may judge that the engine may enter the engine knock control mode when engine temperature is greater than a threshold temperature and engine load is greater than a threshold engine load. If method 200 judges that conditions are met for entering an engine knock control mode, the answer is yes and method 200 proceeds to 212. The engine knock control mode may be requested when the answer is yes. Otherwise, the answer is no and method 200 proceeds to 280.

At 212, method 200 assesses whether or not knock should be indicated for the selected cylinder that is being evaluated for engine knock (e.g., cylinder j). FIG. 7 shows operation of the engine and controller including knock windows and knock sensor sampling (e.g., measuring) according to the method of FIG. 2 for detecting knock when engine knock background noise levels are not being determined. In one example, method 200 computes a knock intensity value for cylinder j by integrating sampled output of the knock sensor during the open knock window of cylinder j and divides the integrated knock sensor output by the total engine knock background noise level of cylinder j for the present engine speed and engine load (e.g., Cyl_combined_noise (j)).

The total or combined engine knock background noise level may be expressed as: Cyl_combined_noise (j)=Cyl_base_noise (j)+Cyl_inj_noise (j)+Cyl_vlv_noise (j), where Cyl_combined_noise (j) is the total engine knock background noise for cylinder j, Cyl_base_noise (j) is the engine knock base background noise for cylinder j, Cyl_inj_noise (j) is the fuel injector noise that is present in the knock window of cylinder j, and Cyl_vlv_noise (j) is the poppet valve noise present in the knock window of cylinder (j). Accordingly, any one of the variables in the combined background noise equation may be solved knowing three of the other variables. For example, Cyl_base_noise (j)=Cyl_combined_noise (j)−Cyl_inj_noise (j) Cyl_vlv_noise (j).

The total engine knock background noise level may be retrieved from controller memory or it may be determined from individual noise contributions that have been retrieved from memory as previously indicated. If knock is detected, the spark is retarded for cylinder j and then the spark timing is advanced back toward the MBT (minimum spark advance for best engine torque at the present engine speed and load) spark timing for cylinder j. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., knock limited spark timing or MBT timing). The presence or absence of engine knock for each cylinder may be determined in this way. The cylinder number j may be adjusted according to an engine firing order each engine cycle (e.g., two revolutions) so that knock is evaluated for each engine cylinder each engine cycle. Method 200 proceeds to exit after adjusting engine spark timing in cylinder j for engine knock.

At 220, method 200 deactivates fuel flow to the engine cylinders while the engine crankshaft continues to rotate. The engine may continue to rotate via the vehicle's kinetic energy rotating the engine via the vehicle's wheels. Fuel flow to the engine may be deactivated by closing all fuel injectors of the engine. Method 200 proceeds to 222.

At 222, method 200 closes and holds closed all engine intake and exhaust poppet valves for at least an engine cycle while the engine crankshaft continues to rotate. The intake and exhaust valves may be held closed via a variable valve actuator system. By closing the intake and exhaust valves, air flow to the catalyst may be reduced to improve engine emissions. Method 200 proceeds to 224.

At 224, method 200 judges if it is desirable to learn engine knock base background noise levels at the present engine speed. Method 200 may judge that it is desirable to learn engine knock base background noise levels at the present engine speed if engine knock indication levels are greater or less than is expected for the present engine speed. Further, method 200 may judge that it is desirable to learn engine knock base background noise levels at the present engine speed if engine knock base background noise levels have not been determined for a predetermined amount of time or a predetermined distanced traveled by the vehicle. If method 200 judges that it is desirable to learn engine knock base background noise levels at the present engine speed, the answer is yes and method 200 proceeds to 226. Learning engine knock base background noise levels may be requested when the answer is yes. If method 200 judges that it is not desirable to learn engine knock base background noise levels at the present engine speed, then the answer is no and method 200 proceeds to 234.

At 226, method 200 determines engine knock base background noise levels for engine cylinders. In one example, method 200 selects a cylinder (e.g., cylinder j, where j is a number assigned to a cylinder and where the value of j may be adjusted to learn engine knock background noise levels for all engine cylinders) and integrates output of a knock sensor during a portion of the open knock window of the selected cylinder. The output of the knock sensor may be integrated numerically or via an integrator circuit to determine the base background noise level of the selected cylinder. The engine knock base background noise level may include noise from the crankshaft, camshaft, and front end accessories, but it does not include noise form injectors opening and/or closing or poppet valves opening and/or closing during the open knock window of the selected cylinder. Method 200 proceeds to 228.

At 228, method 200 judges if engine knock base background noise levels at the present engine speed have been determined for all engine cylinders. Method 200 may keep a record of which engine knock base background noise levels have been updated for particular engine speeds and loads. If method 200 judges that engine knock base background noise levels at the present engine speed have been determined for all engine cylinders, then the answer is yes and method 200 proceeds to 230. Otherwise, the answer is no and method 200 proceeds to 229.

At 229, method 200 selects a new engine cylinder for leaning and evaluating the engine knock base background noise level. A unique engine knock base background noise level may be determined for each engine cylinder at selected engine speeds and loads. Further, unique engine knock base background noise levels for each engine operating mode, engine speed, and engine load may be determined. However, since the engine is operating in DCCO mode at zero cylinder load, the values of all engine knock base background noise levels are not determined at 226. Method 200 may select a new cylinder to evaluate for engine knock base background noise levels via incrementing, decrementing, or otherwise adjusting the value of j. Method 200 returns to 226 after selecting a new engine cylinder to learn and evaluate engine knock base background noise levels.

At 230, method 200 judges if all engine knock base background noise levels determined at 226 are within a threshold value of an average value of the engine knock base background noise levels determined at 226. For example, if the engine knock background noise levels determined at 226 are 1.1, 1.05, 1.08, and 1.15 for a four cylinder engine, which averages to 1.095, and the threshold value is 0.05, which produces a range between 1.045 and 1.145, then the answer is yes and method 200 proceeds to 231. However, if the threshold value is 0.02, then the answer is no and method 200 proceeds to 232.

At 232, method 200 requests diagnostics for the knock sensor of the selected cylinder that has a higher or lower engine knock base background noise than is expected (e.g., cylinders that exhibit engine knock base background noise levels that are greater or less than the average value determined at 230 plus or minus the threshold value described at 230). The threshold value may be empirically determined via rotating the engine with a dynamometer and recording engine knock base background noise levels for the engine cylinders. The diagnostic may include applying a voltage to the knock sensor or causing a cylinder to knock and monitoring knock sensor output to determine whether or not the knock sensor is performing as expected. Method 200 proceeds to 234.

At 231, method 200 stores engine knock base background noise levels determined at 226 to controller memory. The engine knock base background noise levels stored to controller memory may be retrieved from memory to determine the presence or absence of engine knock when combustion is resumed in the engine and the engine is operating at a speed near the present engine speed at which engine knock base background noise levels were determined. For example, if engine knock base background noise levels were determined at an engine speed of 2000 RPM, then the engine knock base background noise levels may be applied to determine the combined engine knock background noise levels for the engine cylinders when the engine is combusting fuel at 2000 RPM at engine loads between 0.07 and 1. By learning engine knock base background noise levels when the engine is not operating (e.g., combusting fuel), it may be possible to learn fewer engine knock base background noise levels. In particular, the engine knock base background noise levels determined when the engine was in DCCO mode may be applied when the engine is combusting fuel in all cylinders or in VDE modes so that engine operation while the engine is running may not have to be changed to determine engine knock base background noise levels. Method 200 proceeds to 234.

Figure 3:
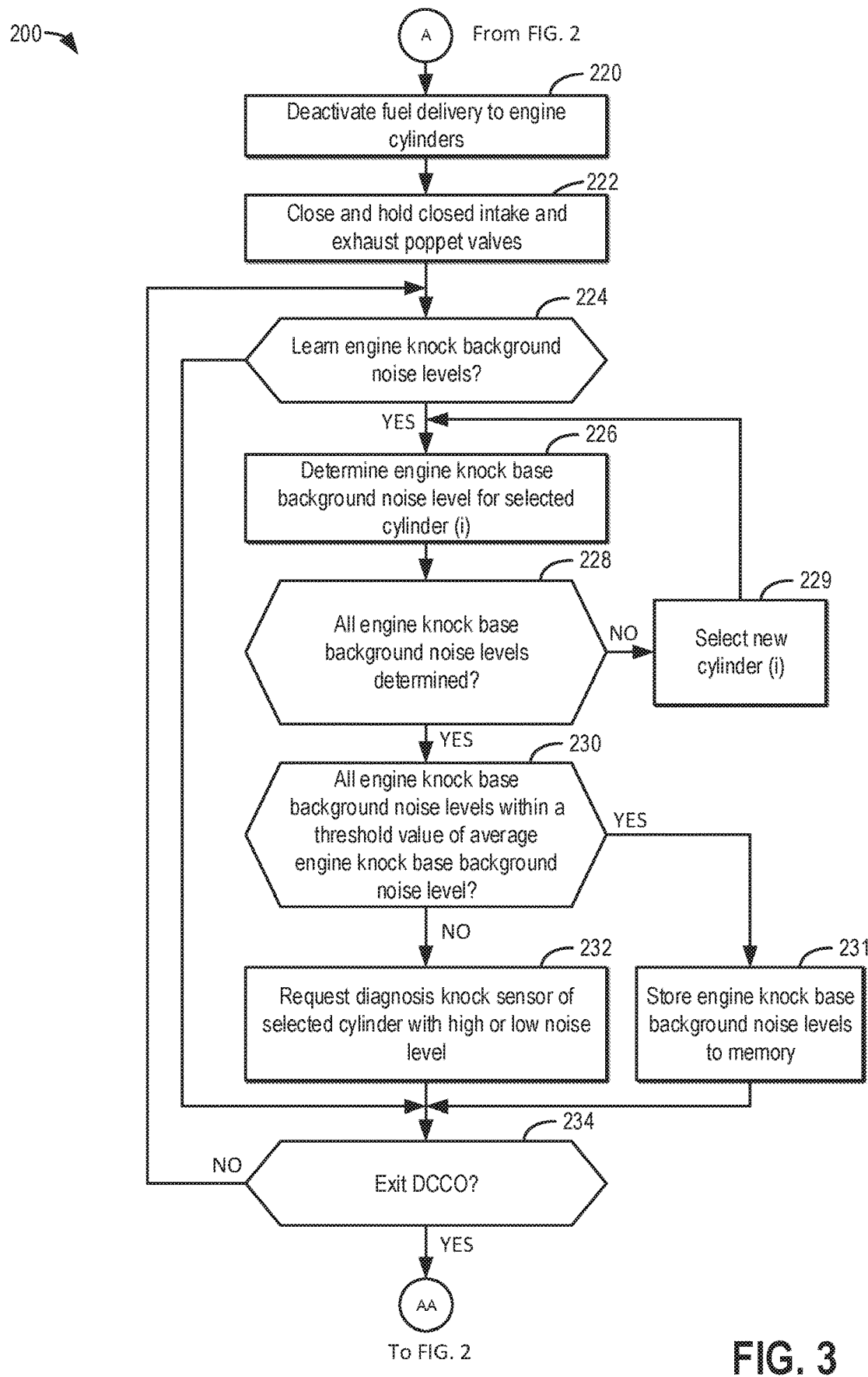

At 234, method 200 judges if vehicle operating conditions are present to exit DCCO mode. In one example, the engine may exit DCCO mode when driver demand torque exceeds a threshold level. Further, method 200 may exit DCCO mode when the driver demand torque exceeds a threshold even before all steps of FIG. 3 are completed. If method 200 judges that conditions are present to exit DCCO mode, then the answer is yes and method 200 proceeds to 206. Otherwise, the answer is no and method 200 returns to 224.

At 240, method 200 deactivates fuel flow to the engine cylinders while the engine crankshaft continues to rotate. The engine may continue to rotate via the vehicle's kinetic energy rotating the engine via the vehicle's wheels. Fuel flow to the engine may be deactivated by closing all fuel injectors of the engine. Method 200 proceeds to 242.

At 242, method 200 continues to open and close all engine intake and exhaust poppet valves while the engine crankshaft continues to rotate. By operating the intake and exhaust valves, pressure in the engine cylinders may be maintained at a level where engine oil consumption may be reduced. Method 200 proceeds to 244.

At 244, method 200 judges if it is desirable to learn engine knock base background noise levels at the present engine speed. Method 200 may judge that it is desirable to learn engine knock base and/or valve background noise levels at the present engine speed if engine knock indication levels are greater or less than is expected for the present engine speed. In addition, method 200 may judge that it is desirable to learn engine knock background noise levels at the present engine speed if engine knock background noise levels have not been determined for a predetermined amount of time or a predetermined distanced traveled by the vehicle. If method 200 judges that it is desirable to learn engine knock background noise levels at the present engine speed, the answer is yes and method 200 proceeds to 246. Learning engine knock background noise levels may be requested when the answer is yes. If method 200 judges that it is not desirable to learn engine knock background noise levels at the present engine speed, then the answer is no and method 200 proceeds to 254.

At 246, method 200 determines engine knock base background noise levels and engine knock valve background noise levels for engine cylinders. In one example, method 200 selects a cylinder (e.g., cylinder j, where j is a number assigned to a cylinder and where the value of j may be adjusted to learn engine knock background noise levels for all engine cylinders) and integrates output of a knock sensor during a portion of the open knock window of the selected cylinder when timing of intake and exhaust poppet valves is adjusted so that the intake and exhaust valves do not open or close when engine cylinder knock windows are open (e.g., predetermined crankshaft angular intervals where output of one or more knock sensors is sampled via the controller). The output of the knock sensor may be integrated numerically or via an integrator circuit to determine the base background noise level of the selected cylinder. The engine knock base background noise level may include noise from the crankshaft, camshaft, and front end accessories, but it does not include noise form injectors opening and/or closing or poppet valves opening and/or closing during the open knock window of the selected cylinder.

Method 200 also determines engine knock valve noise levels for the engine cylinders by adjusting timing of intake and exhaust poppet valves so that the intake and exhaust valves open and/or close when cylinder knock windows are open. For example, method 200 may advance timing of intake or exhaust poppet valves of cylinder number one to determine valve noise for cylinder number three in an eight cylinder engine having a firing order of 1-3-7-2-6-5-4-8. Once intake and/or exhaust valve timing is adjusted such that the intake and/or poppet valves close during an open knock window, then method 200 integrates output of a knock sensor during a portion of the open knock window of the selected cylinder when timing of intake and exhaust poppet valves is adjusted so that the intake and exhaust valves open or close when engine cylinder knock windows are open. The output of the knock sensor may be integrated numerically or via an integrator circuit to determine the engine knock valve noise level of the selected cylinder. The engine knock valve noise level (e.g., Cyl_vlv_noise (j)) may be determined via subtracting the engine knock base background noise level of the selected cylinder from the integrated knock sensor output value determined after the intake and exhaust valve timing has been adjusted to open or close during an open knock window of the selected cylinder. Method 200 proceeds to 248.

At 248, method 200 judges if engine knock base background noise levels and the engine knock valve noise levels at the present engine speed have been determined for all engine cylinders. Method 200 may keep a record of which engine knock base background noise levels and engine knock valve noise levels have been updated for particular engine speeds and loads. If method 200 judges that engine knock base background noise levels and the engine knock valve noise levels at the present engine speed have been determined for all engine cylinders, then the answer is yes and method 200 proceeds to 250. Otherwise, the answer is no and method 200 proceeds to 249.

At 249, method 200 selects a new engine cylinder for leaning and evaluating the engine knock base background noise level and an engine knock valve noise level. A unique engine knock base background noise level and a unique engine knock valve noise level may be determined for each engine cylinder at selected engine speeds and loads. Further, unique engine knock base background noise levels and unique engine knock valve noise levels for each engine operating mode, engine speed, and engine load may be determined. However, since the engine is operating in DFSO mode at zero cylinder load, the values of all engine knock base background noise levels and engine knock valve noise levels are not determined at 246. Method 200 may select a new cylinder to evaluate for engine knock base background noise levels and engine knock valve noise levels via incrementing, decrementing, or otherwise adjusting the value of j. Method 200 returns to 246 after selecting a new engine cylinder to learn and evaluate engine knock base background noise levels and the engine knock valve noise levels.

At 250, method 200 judges if all engine knock base background noise levels determined at 246 are within a threshold value of an average value of the engine knock base background noise levels determined at 246. If so, the answer is yes and method 200 proceeds to 251. Otherwise, the answer is no and method 200 proceeds to 252.

At 252, method 200 requests diagnostics for the knock sensor of the selected cylinder that has a higher or lower engine knock base background noise than is expected (e.g., cylinders that exhibit engine knock base background noise levels that are greater or less than the average value determined at 250 plus or minus the threshold value described at 250). The threshold value may be empirically determined via rotating the engine with a dynamometer and recording engine knock base background noise levels for the engine cylinders. The diagnostic may include applying a voltage to the knock sensor or causing a cylinder to knock and monitoring knock sensor output to determine whether or not the knock sensor is performing as expected. Method 200 proceeds to 254.

At 251, method 200 stores engine knock base background noise levels and engine knock valve noise levels determined at 246 to controller memory. The engine knock base background noise levels and the engine knock valve noise levels stored to controller memory may be retrieved from memory to determine the presence or absence of engine knock when combustion is resumed in the engine and the engine is operating at a speed near the present engine speed at which engine knock base background noise levels were determined. By learning engine knock base background noise levels and engine knock valve noise levels when the engine is not operating (e.g., combusting fuel), it may be possible to learn fewer engine knock base background noise levels and fewer engine knock valve noise levels when the engine is operating. In particular, the engine knock base background noise levels and engine knock noise levels determined when the engine was in DFSO mode may be applied when the engine is combusting fuel in all cylinders or in VDE modes so that engine operation while the engine is running may not have to be changed to determine engine knock base background noise levels and engine knock valve noise levels. Method 200 proceeds to 254.

Figure 4:
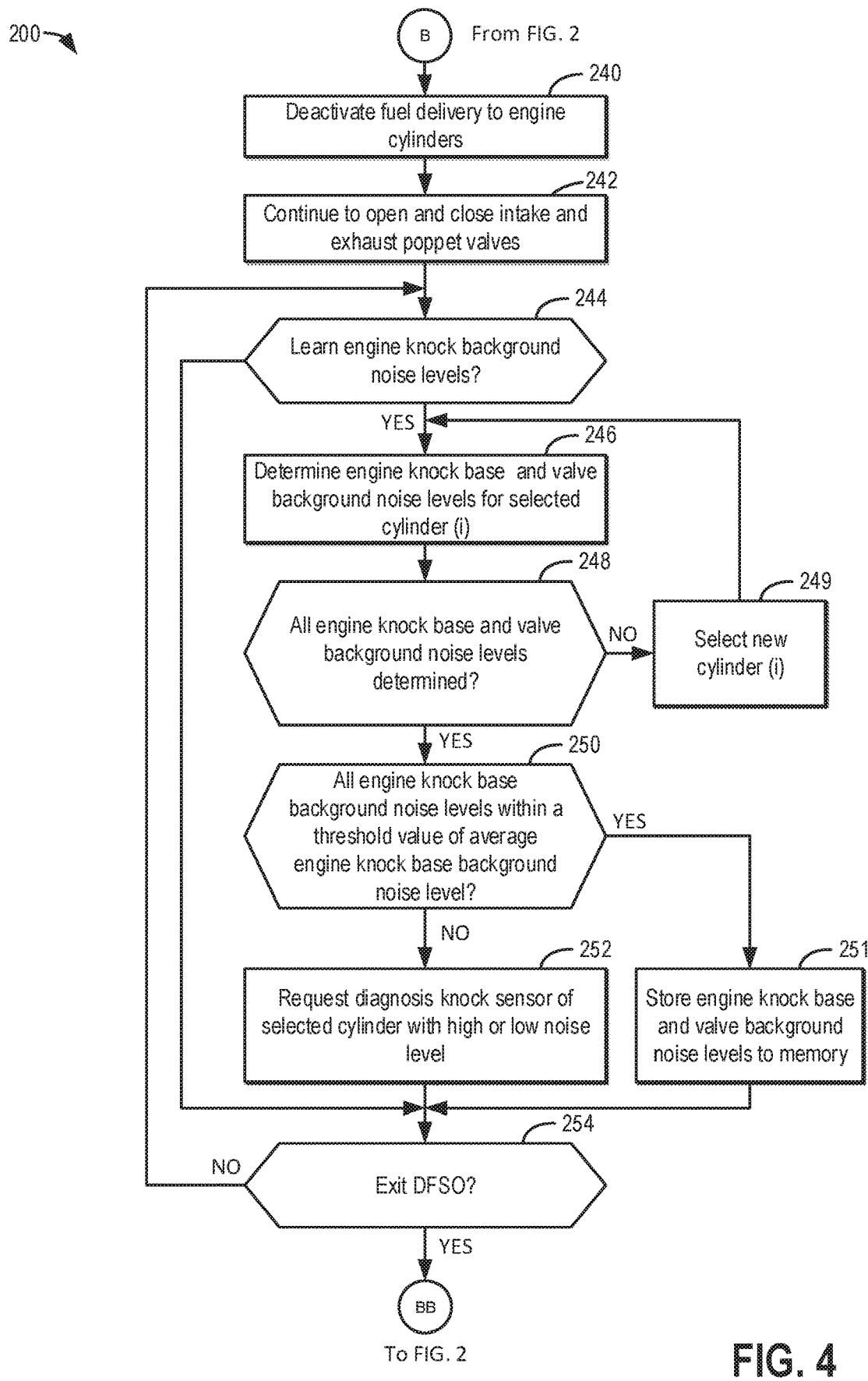
Figure 5:
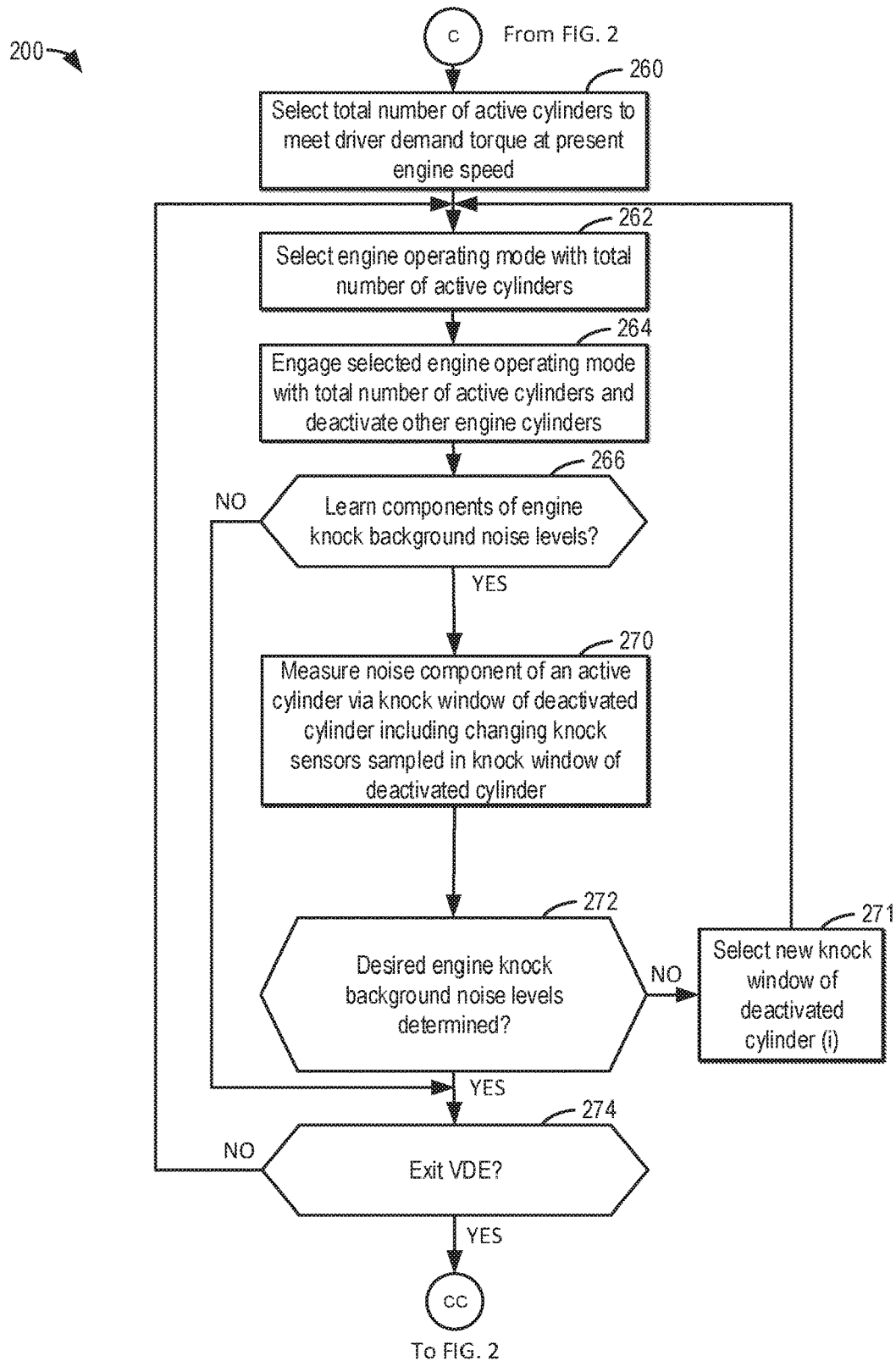
Figure 6:
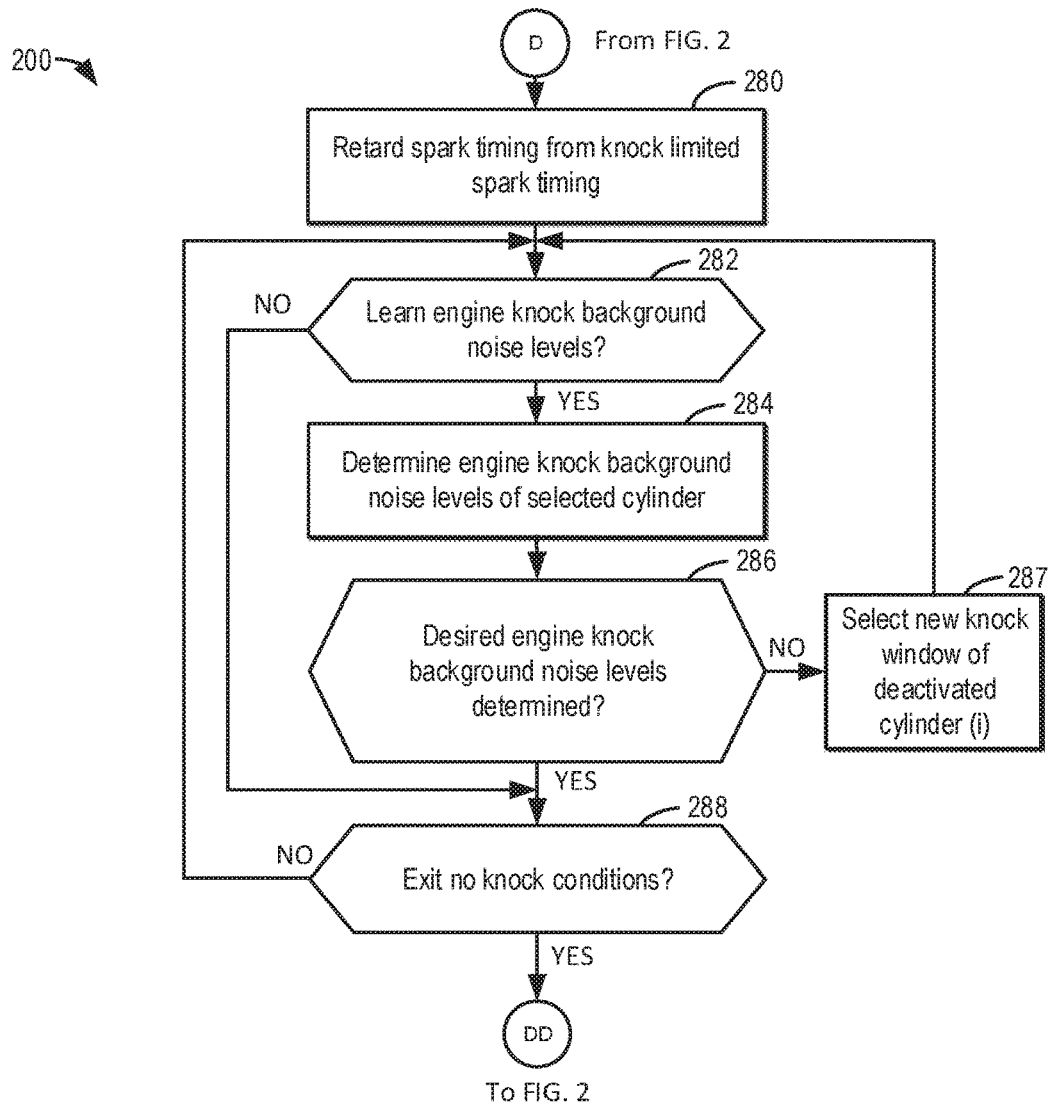

At 254, method 200 judges if vehicle operating conditions are present to exit DFSO mode. In one example, the engine may exit DFSO mode when driver demand torque exceeds a threshold level. Further, the engine may also exit DFSO mode when driver demand torque exceeds a threshold even before all the steps of FIG. 4 are completed. If method 200 judges that conditions are present to exit DFSO mode, then the answer is yes and method 200 proceeds to 208. Otherwise, the answer is no and method 200 returns to 244.

At 260, selects an actual total number of cylinders that are active to meet the driver demand torque. The driver demand torque may be determined from accelerator pedal position and vehicle speed. The accelerator pedal position and vehicle speed may reference a table or function of empirically determined value of driver demand torque, which may be requested as an engine torque or a wheel torque. The table or function outputs the driver demand torque and driver demand torque and vehicle speed may reference second table that outputs an actual total number of cylinders to activate. The actual total number of cylinders to activate may be a least actual total number of engine cylinders that may provide the driver demand torque at the present engine speed. Method 200 proceeds to 262 after determining the actual total number of cylinders to activate.

At 262, method 200 selects an engine operating mode and cylinder pattern (e.g., cylinders that combust fuel in the engine operating mode). The engine operating mode (e.g., stationary VDE four cylinder mode (four active cylinders) with a firing order of 1-7-6-4, a rolling VDE mode with firing density of ⅔, etc.) may be selected from the actual total number of cylinders to activate as determined at 260. The engine operating modes may include activated and deactivated engine cylinders. Alternatively, the engine operating mode may be selected via a state machine with inputs of driver demand torque and engine speed or vehicle speed. In one example, the engine operating mode may be selected from engine operating modes that are available at the present driver demand torque and engine speed. Engine operating modes that are available may be a function of engine temperature, engine speed, engine noise and vibration, and other engine and vehicle operating conditions. Method 200 selects an engine operating mode according to the actual total number of cylinders selected to operate at 260 and other engine and vehicle operating conditions. Method 200 proceeds to 264.

At 264, method 200 operates the engine in the selected VDE operating mode with the selected actual total number of active cylinders that were determined at 260. The controller may activate and/or deactivate cylinders via ceasing to flow fuel to deactivated cylinders and flowing fuel to activated cylinders during cycles of the engine. Further, intake and exhaust poppet valves of deactivated cylinders may be held closed for longer than an engine cycle. Intake and exhaust poppet valves of activated cylinders are opened and closed during an engine cycle. Method 200 may flow fuel to the engine via opening fuel injectors. Method 200 may cease flow of fuel to engine cylinders via closing fuel injectors. Method 200 may deactivate intake and exhaust poppet valves via variable valve actuators. Method 200 proceeds to 266 after the engine enters the selected engine operating mode with the selected cylinder pattern.

At 266, method 200 judges if it is desirable to learn contributions (e.g., Cyl_base_noise (j), Cyl_inj_noise (j), and Cyl_vlv_noise (j)) of engine knock background noise levels at the present engine speed and engine load. Method 200 may judge that it is desirable to learn engine knock background noise levels at the present engine speed if engine knock indication levels are greater or less than is expected for the present engine speed. In addition, method 200 may judge that it is desirable to learn engine knock background noise levels at the present engine speed if engine knock background noise levels have not been determined for a predetermined amount of time or a predetermined distanced traveled by the vehicle. If method 200 judges that it is desirable to learn engine knock background noise levels at the present engine speed and load, the answer is yes and method 200 proceeds to 268. Learning engine knock background noise levels may be requested when the answer is yes. If method 200 judges that it is not desirable to learn engine knock background noise levels at the present engine speed and load, then the answer is no and method 200 proceeds to 274.

At 268, method 200 determines contributions (e.g., Cyl_base_noise (j), Cyl_inj_noise (j), and Cyl_vlv_noise (j)) of engine knock background noise at the present engine speed and load via knock windows associated with one or more deactivated engine cylinders or via one or more newly created crankshaft angular windows during which output of a knock sensor is sampled via the controller. The engine may operate with one or more deactivated cylinders (e.g., cylinders that are not combusting fuel) when the engine operates in a VDE mode. Knock cannot be present in engine cylinders that are deactivated since fuel is not combusted in deactivated cylinders.

A knock window that is associated with a particular cylinder is a knock window in which knock sensor output is evaluated for the purpose of determining knock in the particular cylinder during a cycle of an engine. However, the knock window may still be associated with the particular cylinder even if it is not applied for the purpose of determining knock in the particular engine cylinder because each engine cylinder may be allocated an amount of controller computational resources for detecting engine knock, including generating a knock window and sampling a knock sensor during the knock window. Consequently, a knock window that is associated with a particular cylinder may be adjusted to open and close at times when knock is not expected to occur within the particular cylinder. Yet, the knock window may still be considered associated with the cylinder since controller computational resources that may be allocated to determine the presence or absence of engine knock in the particular cylinder are applied to generate the knock window even though timing of the knock window may not allow for knock detection in the particular cylinder.

Alternatively, instead of describing adjusting timing of a knock window that is associated with a particular cylinder, a knock window of a particular cylinder may be discontinued (e.g., a knock window associated with the particular cylinder) and it may be replaced via different crankshaft angular interval where output of a knock sensor is sampled or measured via the controller. The total number of crankshaft intervals where one or more knock sensors are sampled when one or more cylinders is deactivated may be equal to or less than the actual total number of activated cylinders plus the actual total number of deactivated cylinders. An angular interval where output of a knock sensor is sampled need not be provided for each deactivated cylinder. For example, if two cylinders are deactivated and six cylinders are activated, seven crankshaft angular intervals where output of one or more knock sensors is sampled may be provided.

Method 200 adjusts timing of a knock window associated with a deactivated cylinder, or alternatively, method 200 ceases providing a knock window associated with the deactivated cylinder and generates a new crankshaft angular window where output of a knock sensor is sampled to determine a contribution of engine background noise. For example, as shown in FIGS. 7 and 9, timing of an engine knock window 702 associated cylinder number three, may be adjusted or replaced via a new crankshaft angular window where output of a knock sensor is sampled such that the adjusted or new window spans (e.g., begins before and ends after) an event that generates or influences a contribution of engine background noise. In particular, knock window 702 in FIG. 7 is moved to the timing shown by window 702a in FIG. 9. Alternatively, window 702 may be described as being removed or ceased and new knock window 702a may be provided in its place since knock window 702 is not needed to detect knock in cylinder three when cylinder three is deactivated. The knock window associated with cylinder number three, or a new crankshaft angular interval where output of a knock sensor is sampled, may be adjusted to any crankshaft angle timing that is desired to detect a contribution of engine background noise. The output of the knock sensor sampled during the crankshaft interval may be integrated to generate a value for the contribution engine knock background noise. Further, method 200 may sample an output of a first knock sensor when the knock window of a particular cylinder is provided to determine the presence or absence of knock in the particular cylinder. However, an output of the first knock sensor, or alternatively, a second knock sensor, may be sampled during the adjusted knock window that is associated with the particular cylinder, or alternatively, during the crankshaft angular interval where a knock sensor is sampled that replaces the knock window that is associated with the particular cylinder when the particular cylinder is deactivated and knock is not expected in the particular cylinder. The contributions of engine background noise may be determined from the sampled knock sensor output. This allows the controller to observe contribution engine knock background noise levels with different knock sensors for knock sensor and engine component diagnostics.

Method 200 may determine contributions (e.g., Cyl_base_noise (j), Cyl_inj_noise (j), and Cyl_vlv_noise (j)) of engine knock background noise at the present engine speed and load for all available VDE modes and cylinder patterns via applying controller resources for generating engine knock windows and detecting engine knock in one or more deactivated engine cylinders. In one example, a table or function may include references to all engine operating modes that are available at the present engine speed and load as well as all of the contributions of engine knock background noise that may be determined when the engine operates in the engine operating modes that are available. Values associated with table entries may be the basis for determining whether or not a particular contribution of engine background noise for the present engine speed and load has been learned or modified recently. A non-limiting example of adjusting angular crankshaft intervals for sampling knock sensor output via controller computational resources that were previously allocated to a presently deactivated cylinder is shown in FIG. 9. Method 200 may store the contributions of engine noise to controller memory. Method 200 proceeds to 270 after determining noise contributions of engine background noise for the present engine speed and load.

At 270, method 200 assesses whether or not knock should be indicated for a selected cylinder that is being evaluated for engine knock (e.g., cylinder j). FIG. 9 shows operation of the engine and controller including knock windows and knock sensor sampling (e.g., measuring) according to the method of FIG. 2 for detecting knock when an engine is operating in a VDE mode. FIG. 9 also shows how knock windows of deactivated cylinders may be applied to determine contributions of engine noise as previously discussed. In one example, method 200 computes a knock intensity value for cylinder j by integrating sampled output of the knock sensor during the open knock window of cylinder j and divides the integrated knock sensor output by the total engine knock background noise level of cylinder j for the present engine speed and engine load (e.g., Cyl_combined_noise (j)).

The total or combined engine knock background noise level may be expressed as: Cyl_combined_noise (j)=Cyl_base_noise (j)+Cyl_inj_noise (j)+Cyl_vlv_noise (j), where Cyl_combined_noise (j) is the total engine knock background noise for cylinder j, Cyl_base_noise (j) is the engine knock base background noise for cylinder j, Cyl_inj_noise (j) is the fuel injector noise that is present in the knock window of cylinder j, and Cyl_vlv_noise (j) is the poppet valve noise present in the knock window of cylinder (j). Accordingly, any one of the variables in the combined background noise equation may be solved knowing three of the other variables. For example, Cyl_base_noise (j)=Cyl_combined_noise (j)−Cyl_inj_noise (j) Cyl_vlv_noise (j).

The total engine knock background noise level may be retrieved from controller memory or it may be determined from individual noise contributions that have been retrieved from memory as previously indicated. If knock is detected, the spark is retarded for cylinder j and then the spark timing is advanced back toward the MBT (minimum spark advance for best engine torque at the present engine speed and load) spark timing for cylinder j. If knock is not indicated, spark timing for the cylinder remains at its requested or base timing (e.g., knock limited spark timing or MBT timing). The presence or absence of engine knock for each cylinder may be determined in this way. The cylinder number j may be adjusted according to an engine firing order each engine cycle (e.g., two revolutions) so that knock is evaluated for each engine cylinder each engine cycle. Method 200 proceeds to 272 after adjusting engine spark timing in cylinder j for engine knock.

At 272, method 200 judges if the desired contribution engine knock background noise levels at the present engine speed have been determined for all engine cylinders. Method 200 may keep a record of which contribution engine knock background noise levels have been updated for the present particular engine speed and load. If method 200 judges that component engine knock background noise levels at the present engine speed have been determined for all engine cylinders, then the answer is yes and method 200 proceeds to 274. Otherwise, the answer is no and method 200 proceeds to 271.

At 271, method 200 selects a new knock window to use to detect contribution engine knock background noise. For example, if cylinder number two is deactivated, then method 200 may adjust timing of the knock window associated with cylinder number two to determine contribution engine knock background noise levels. Alternatively, the knock window associated with cylinder number two may be discontinued and a new crankshaft angular interval where output of a knock sensor is sampled may be generated to determine contribution engine knock background noise levels. Method 200 returns to 262.

At 274, method 200 judges if vehicle operating conditions are present to exit VDE mode. In one example, the engine may exit VDE mode when driver demand torque exceeds a first threshold level or is reduced below a second threshold level. If method 200 judges that conditions are present to exit VDE mode, then the answer is yes and method 200 proceeds to 210. Otherwise, the answer is no and method 200 returns to 262.

At 280, method 200 selects the cylinder for which the cylinder's background noise levels are to be learned and updated. In one example, the selected cylinder is the cylinder for which it is desired to adjust an engine knock background noise level. For example, if it is desired to update or learn the engine knock background noise level for cylinder number one, then cylinder number one may be the selected cylinder. Logic for selecting the engine cylinder may be stored in controller memory. In one example, cylinder number one is first selected and then the selected cylinder (j) is incremented by a value of one until each cylinder has been selected and the engine knock background noise levels of each engine cylinder have been established.

At 282, method 200 judges if it is desirable to learn contributions (e.g., Cyl_base_noise (j), Cyl_inj_noise (j), and Cyl_vlv_noise (j)) of engine knock background noise levels at the present engine speed and engine load. If method 200 judges that it is desirable to learn engine knock background noise levels at the present engine speed and load, the answer is yes and method 200 proceeds to 284. Learning engine knock background noise levels may be requested when the answer is yes. If method 200 judges that it is not desirable to learn engine knock background noise levels at the present engine speed and load, then the answer is no and method 200 proceeds to 288.

At 284, method 200 adjusts engine load to meet driver demand torque when spark of the selected cylinder is retarded to reduce the possibility of engine knock. In one example, engine load may be increased by increasing air flow through the engine via opening the engine's throttle. Engine torque may be maintained to meet driver demand torque by increasing the engine load even though spark timing of the selected cylinder may be retarded.

Method 200 also operates N−1 cylinders with knock limited spark timing (e.g., spark timing where engine knock begins to be observed) or MBT spark timing while the spark timing of the selected cylinder is retarded from knock limited spark timing or MBT spark timing, where N is the total actual number of engine cylinders. By retarding the spark timing of the selected cylinder, the possibility of knock in the selected cylinder may be significantly reduced so that an accurate estimate of background engine noise for the selected cylinder may be determined.

Method 200 determines a combined background noise level Cyl_combined_noise (j) for the selected cylinder. In one example, method 200 integrates output of a knock sensor during a portion of the open knock window of the selected cylinder. The output of the knock sensor may be integrated numerically or via an integrator circuit to determine the base background noise level of the selected cylinder. Method 200 stores the value of the combined background noise level to controller memory. The combined background noise level may include noise from injectors opening and/or closing during the open knock window and/or poppet valves opening and/or closing during the open knock window. The combined background noise level for a cylinder may be useful for determining the contributions of noise sources. The combined background noise may be expressed as Cyl_combined_noise (j)=Cyl_base_noise (j)+Cyl_inj_noise (j)+Cyl_vlv_noise (j). Accordingly, any one of the variables in the combined background noise equation may be solved knowing three of the other variables. For example, Cyl_base_noise (j)=Cyl_combined_noise (j)−Cyl_inj_noise (j)−Cyl_vlv_noise (j).

Next, method 200 adjusts intake and exhaust valve timing of one or more cylinders so that intake and/or exhaust valves do not close during the open engine knock window of the selected cylinder. Alternatively, or additionally, method 200 adjusts intake and exhaust valve timing of one or more cylinders so that intake and/or exhaust valves do not open during the open engine knock window of the selected cylinder. By removing the intake and exhaust valve opening and closing noise from an open knock window of the selected cylinder, it may be possible determine a more accurate value of base engine background noise level. In addition, adjustments to throttle position may be made to maintain engine torque when poppet valve timings are adjusted.

Method 200 also adjusts direct injection fuel injector timing of one or more cylinders so that DI fuel injectors are not opened or closed during the open engine knock window of the selected cylinder. Adjusting the timing of the DI injector includes deactivating a DI injector and activating a port fuel injector so that noise from the DI injector does not enter the open knock window of the selected cylinder. Thus, DI injectors that open or close during the open knock window of the selected cylinder may be adjusted from a base timing of a DI injector so as to remove noise from DI injectors that open or close during the open knock window of the selected cylinder. By removing the DI injector noise from an open knock window of the selected cylinder, it may be possible determine a more accurate value of base engine background noise level.

Method 200 determines a base background noise level Cyl_base_noise (j) for the selected cylinder via integrating output of a knock or vibration sensor during a portion of the open knock window of the selected cylinder. The output of the knock sensor may be integrated numerically or via an integrator circuit to determine the base background noise level of the selected cylinder. Method 200 stores the value of the base background noise level to controller memory.

Method 200 adjusts direct injection fuel injector timing of one or more cylinders so that DI fuel injectors of all cylinders operate at their base timings or timings that provide similar noise levels in the knock window. Thus, one or more DI injectors may open or close during the open engine knock window of the selected cylinder. Adjusting the timing of the DI injector includes reactivating one or more DI injectors and deactivating one or more port fuel injectors so that noise from the DI injector that may enter the open knock window of the selected cylinder may be determined. By adding the DI injector noise to the open knock window of the selected cylinder, it may be possible determine the noise contribution of one or more DI injectors to the total engine background noise level.

Method 200 determines a DI injector background noise level Cyl_inj_noise (j) for the selected cylinder. In one example, method 200 integrates output of a knock sensor during a portion of the open knock window of the selected cylinder and then the base background noise level previously determined is subtracted from the integrated value. The result is the contribution of DI injector noise to the total cylinder background noise level for the selected cylinder. The output of the knock sensor may be integrated numerically or via an integrator circuit to determine the contribution of DI injector noise to the total cylinder background noise level for the selected cylinder. Method 200 stores the value of the contribution of DI injector noise to the total cylinder background noise level for the selected cylinder to controller memory.

Then, method 200 adjusts direct injection fuel injector timing of one or more cylinders so that DI fuel injectors are not opened or closed during the open engine knock window of the selected cylinder. Thus, DI injectors that open or close during the open knock window of the selected cylinder may be adjusted from a base timing of a DI injector so as to remove noise from DI injectors that open or close during the open knock window of the selected cylinder. By removing the DI injector noise from an open knock window of the selected cylinder, it may be possible to determine a more accurate value of noise from intake/exhaust valves that open and/or close during a knock window of the selected cylinder.

Method 200 adjusts intake and/or exhaust valve timing of one or more cylinders so that poppet valve opening and closings of all cylinders operate at their base timings. Thus, one or more poppet valves may open or close during the open engine knock window of the selected cylinder. By adding the poppet valve noise to the open knock window of the selected cylinder, it may be possible to determine the noise contribution of one or more intake and/or exhaust poppet valves to the total cylinder background noise level for the selected cylinder.

Method 200 determines a poppet valve background noise level Cyl_vlv_noise (j) for the selected cylinder. In one example, method 200 integrates output of a knock sensor during a portion of the open knock window of the selected cylinder and then the base background noise level previously determined is subtracted from the integrated value. The result is the contribution of poppet valve noise to the total cylinder background noise level for the selected cylinder. The output of the knock sensor may be integrated numerically or via an integrator circuit to determine the contribution of poppet valve noise to the total cylinder background noise level for the selected cylinder. Method 200 stores the value of the contribution of poppet valve noise to the total cylinder background noise level for the selected cylinder to controller memory. Method 200 proceeds to 286.

At 286, method 200 judges if all desired engine knock background noise levels at the present engine speed have been determined. Method 200 may keep a record of which engine knock base background noise levels and engine knock valve noise levels have been updated for particular engine speeds and loads. If method 200 judges that engine knock background noise levels have been determined for all engine cylinders, then the answer is yes and method 200 proceeds to 288. Otherwise, the answer is no and method 200 proceeds to 287.

At 287, method 200 selects a new engine cylinder for leaning and evaluating the engine knock background noise levels. Method 200 returns to 282 after selecting a new engine cylinder to learn and evaluate engine knock background noise levels.

At 288, method 200 judges if vehicle operating conditions are present to exit no knock conditions. In one example, the engine may exit no knock conditions when driver demand torque exceeds a first threshold level and/or when engine temperature is greater than a threshold temperature. If method 200 judges that conditions are present to exit no knock mode, then the answer is yes and method 200 proceeds to 212. Otherwise, the answer is no and method 200 returns to 282.

Thus, the method of FIGS. 2-6 provides for an engine operating method, comprising: ceasing to supply fuel to a first engine cylinder via a controller; adjusting open timing of a knock window of the first engine cylinder to span a timing of a closing of a device of a second cylinder via the controller while fuel delivery to the first engine cylinder is ceased; and sampling output of a knock sensor during the knock window via the controller. The method further comprises generating an engine knock background noise level via sampling output of the knock sensor. The method further comprises generating an indication of engine knock via the engine knock background noise level. The method includes where the device is a port fuel injector, and where the engine is rotating when ceasing to supply fuel to the first engine cylinder. The method includes where the device is a direct fuel injector. The method includes where the device is a poppet valve. The method includes where the poppet valve is an intake valve.

The method of FIGS. 2-6 also provides for an engine operating method, comprising: ceasing to supply fuel to all engine cylinders via a controller; adjusting poppet valve timing of all engine cylinders such that intake and exhaust valves do not close while knock windows of all engine cylinders are open via the controller while fuel delivery to all engine cylinders is ceased; and sampling output of one or more knock sensors while knock window of all engine cylinders are open via the controller. The method includes where four knock sensors are sampled during a cycle of an engine. The method includes where adjusting poppet valve timing includes retarding exhaust valve opening. The method includes where adjusting poppet valve timing includes advancing exhaust valve closing. The method further comprises adjusting the poppet valve timing of each cylinder included in all engine cylinders such that the intake or exhaust valves of at least one cylinder close while a knock windows of at least one of all engine cylinders is open. The method further comprises generating an engine knock base background noise level for each cylinder based on data gathered during the sampling of output of the one or more knock sensors. The method further comprises generating an indication of engine knock based on at least one of the engine knock base background noise levels.

Referring now to FIG. 7, a timing sequence 700 that illustrates example base engine knock window timing, direct injector timing, and intake and exhaust poppet valve opening and closing timing is shown. The sequence applies to when the presence or absence of knock in engine cylinders is being evaluated and/or detected. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences are shown visually by DI injections and poppet valve timings. The bars above each cylinder number indicates that the cylinder is deactivated (e.g., not combusting fuel).

The engine knock windows for each cylinder are positioned at a level of a tick mark along the vertical axis that is associated with the knock window. For example, the engine knock window for or associated with cylinder number one is indicated by slash bar 701. Knock windows for the remaining engine cylinders (2-8) are indicated by bars (702-708) that align with labeling along the vertical axis. The controller may sample (e.g., measure) output of the knock sensor when a knock window of a cylinder is open. An open knock window is a crankshaft region where engine knock may be expected for a particular engine cylinder.

Knock window 701 includes a slash pattern that indicates that output of knock sensor 90*a* is sampled during the open knock window of cylinder number one. Knock window 704 includes the same slash pattern that indicates that output of knock sensor 90*a* is sampled during the open knock window of cylinder number two. Knock window 702 includes a plaid pattern that indicates that output of knock sensor 90*b* is sampled during the open knock window of cylinder number three. Knock window 707 also includes a plaid pattern that indicates that output of knock sensor 90*b* is sampled during the open knock window of cylinder number four. Knock window 706 includes a horizontal line pattern that indicates that output of knock sensor 90*c* is sampled during the open knock window of cylinder number five. Knock window 705 includes the same horizontal line pattern that indicates that output of knock sensor 90*c* is sampled during the open knock window of cylinder number six. Knock window 703 includes a vertical line pattern that indicates that output of knock sensor 90*d* is sampled during the open knock window of cylinder number seven. Knock window 708 also includes a vertical line pattern that indicates that output of knock sensor 90*d* is sampled during the open knock window of cylinder number eight. Thus, the knock sensor that is sampled during a particular knock window is indicated by the pattern contained within the knock window.

The engine fuel injection timings for each cylinder are positioned at a level the tick mark along the vertical axis that is associated with the fuel injection. For example, solid bar 710 represents a DI fuel injector open interval for cylinder number two. The DI fuel injector for cylinder number two is closed when solid bar 710 is not visible. The DI fuel injector for cylinder number two opens at the left side of solid bar 710 and closes at the right side of solid bar 710. DI fuel injections for the remaining engine cylinders (2-8) are indicated by similar solid bars (711-717) and they follow the same convention as solid bar 710. The fuel injector bars 710-717 respectively align with cylinders listed along the vertical axis that the fuel injector bars correspond to.

The strokes of a cylinder are positioned just above a level the tick mark along the vertical axis that is associated with the stroke. For example, strokes for cylinder number one are indicated by horizontal lines 720-723. Letters p, e, i, and c identify the power (p), exhaust (e), intake (j), and compression (c) strokes associated with cylinder number one. Strokes for the other engine cylinders are identified in a similar way by lines 725-758.

The exhaust valve timings for each cylinder are positioned above a level the tick mark along the vertical axis that is associated with the exhaust valve timings. For example, exhaust valve opening time for cylinder number one is indicated by cross-hatched bar 760. The exhaust valves for cylinder number one are closed when no cross-hatched bar is present above the cylinder strokes of cylinder number one. Exhaust valve opening times for the other cylinders are indicated at 762, 764, 767, 770, 772, 774, 775, 777, and 778.

The intake valve timings for each cylinder are positioned above a level the tick mark along the vertical axis that is associated with the intake valve timings. For example, intake valve opening time for cylinder number one is indicated by dotted bar 761. The intake valves for cylinder number one are closed when no dotted bar is present above the cylinder strokes of cylinder number one. The intake valve opening times for the other cylinders are indicated at 763, 765, 766, 768, 769, 771, 773, 776, and 779.

The noise observed in a knock window of one cylinder may include noise related to events associated with other engine cylinders. For example, the engine knock window of cylinder number two indicated at 704 may occur at a time when the knock sensor is exposed to noise from the DI injection to cylinder number four at 713 if the fuel injection into cylinder number four ends (e.g., the fuel injector closes) when knock window 704 is open. In this example, DI injection 713 ends before knock window 704 is opened. Similar relations between DI injections to other cylinders and the knock sensor output in other knock windows may also be present.

Thus, in this example, the engine knock background noise level determined for the engine knock window of cylinder number two shown at 404 may not include noise generated by closing the DI injector at 713. In addition, the intake valve closing of cylinder number five indicated by dotted bar 773 shows that the intake valve of cylinder number five closes and may generate noise within the time that the knock window of cylinder number two is open as shown by bar 704. Further, the exhaust valve closing of cylinder number eight indicated by dotted bar 778 shows that the exhaust valve of cylinder number eight closes and may generate noise within the time that the knock window of cylinder number two is open as shown by bar 704. Further still, the exhaust valve opening of cylinder number seven indicated by bar 764 shows that the exhaust valve of cylinder number seven opens and may generate noise within the time that the knock window of cylinder number two is open as shown by bar 704. Consequently, in this example, engine background noise as determined via the engine knock window for cylinder number two at 704 may not include noise from DI event 713, but may include noise from valve closing event of valve timing 773, valve opening event at valve timing 764, and valve closing event at valve timing 778.

The poppet valve and DI injection times shown in FIG. 7 may be indicative of base DI and poppet valve timings. These timings may affect the engine background noise levels determined from engine knock windows of the cylinders (e.g., 704). While it may be desirable to include all background noise sources to determine a background noise level for a particular cylinder, it may also be useful to decompose a total background noise level into the contributions from individual noise sources. By removing one or more noise influences from a total engine background noise level, it may be possible to determine engine noise levels that may be used to determine whether or not knock is present in other cylinders. For example, a base engine knock background noise level for cylinder number one may be used as a base engine knock background noise level for cylinder number three. Further, the poppet valve noise or DI injector noise of one cylinder may be applied to a different cylinder to estimate engine knock background noise for the different cylinder. Such allocations engine knock background noise levels may be useful when an engine knock background noise level has not been observed for a particular engine cylinder or if opportunities for learning engine knock background noise levels is limited by vehicle operating conditions. The sequence of FIG. 7 may be provided via the method of FIGS. 2-6.

Referring now to FIG. 8, a timing sequence 800 that illustrates example base engine knock window timing for an engine operating in DFSO mode is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences have been removed from the engine knock window of cylinder number two to show how a base engine knock background noise level of cylinder number two may be determined and learned. The sequence of FIG. 8 may be provided via the method of FIGS. 2-6.

Since the engine is in DFSO mode, fuel is not injected, but poppet valves continue to operate. In this example, the poppet valve timings of the cylinders are adjusted (e.g., advanced or retarded relative to base timings shown in FIG. 7) so that engine knock base background noise levels for the cylinders may be determined. Thus, poppet valves do not open and close during knock window 704. Engine strokes and knock windows for each of the cylinders shown in FIG. 8 are identical to those shown in FIG. 7, except as noted below. Therefore, for the sake of brevity, the description of these items will not be repeated. Nevertheless, the timings and sequence shown in FIG. 8 is identical to that shown in FIG. 7, except as noted.

In this example, poppet valve closings and DI injector closings have been removed from the knock window of each cylinder so that a base background noise level of each cylinder may be established by integrating the output of an engine knock sensor during the engine knock window of each cylinder. For example, the engine knock window for cylinder number two during this engine cycle is indicated by bar 704 and timing of the intake valve indicated at 773*a* has been modified so that the intake valve does not close when knock window 704 is open. Likewise, valve timings 760*a*-770*a* and 772*a*-779*a* has been adjusted to remove poppet valve opening and closing noise from timings (e.g., crankshaft angles) when knock windows 701-708 are open so that engine knock base background noise levels may be established for each cylinder.

As an example, the base engine background noise level of cylinder number two may be determined via integrating output of a vibration based knock sensor during at portion of open knock window 704. This base engine background noise level may be applied to determine the presence of knock in cylinder number two or other engine cylinders. Further, this base engine background noise level does not include noise from DI injectors or poppet valves opening and closing while knock window 704 is open so that influence of injector and valve opening and closing may be reduced. The poppet valve timings shown in FIG. 8 may be indicative of modified poppet valve timings for determining a base engine knock background noise level.

It should also be noted that the opening and closing times or crankshaft angles of the poppet valve timings shown in FIG. 8 may be adjusted to fall within knock windows 701-708 so that contributions of poppet valves opening and closing to a total or combined engine knock background noise level may be determined. In one example, a value of an engine knock base background noise level of a cylinder may be subtracted from a value of engine knock background noise that includes valve openings and closings during the knock window to generate the engine knock valve noise level.

Referring now to FIG. 9, a timing sequence 900 that illustrates adjusting timing of a knock window that is associated with a deactivated cylinder to determine engine knock background noise levels is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, port injections have been provided so that direct fuel injectors do not close during knock windows of engine cylinders. Further, instead of sampling output of a first knock sensor that is applied to detect knock in a first cylinder during a knock window associated with a first cylinder when knock may be expected in the first cylinder, output of a second knock sensor is sampled during the knock window associated with the first cylinder so that engine noise sources may be sampled from different locations to improve diagnostics and improve signal to noise characteristics for detecting noise from various engine noise sources (e.g., fuel injectors, poppet valves, front end accessories, etc.).

The fuel injections, valve timings, cylinder strokes, and engine position for each of the cylinders shown in FIG. 9 are identical to those shown in FIG. 7, except as noted below. Therefore, for the sake of brevity, the description of these items will not be repeated. Nevertheless, the timings and sequence shown in FIG. 9 is identical to that shown in FIG. 7, except as noted.

In this example, the engine is operating in a stationary VDE mode where cylinders 3, 2, 5, and 8 are deactivated as indicated by the bars above the respective cylinder labels. This allows knock windows of one or more deactivated cylinders to capture and determine levels of noise from specific noise sources. The timing of knock windows associated with deactivated engine cylinders may be adjusted so that the knock windows associated with deactivated engine cylinders are open and span (e.g., knock windows open before and close after the noise event to be measured or observed) noise generating events (e.g., intake and exhaust poppet valve openings and closings, fuel injector openings and closings, etc.).

Alternatively, this may be described as ceasing to generate a knock window for a deactivated cylinder and generating a new crankshaft window where a knock sensor is sampled to determine a noise level generated by an event (e.g., opening or closing of a device) of a noise source. Thus, if an engine has eight cylinders and eight knock windows are generated to observe knock in the eight cylinders during conditions when the engine may be expected to knock, then eight crankshaft angular intervals where one or more knock sensors are sampled may be generated when one or more cylinders are deactivated. However, timings of a total number of angular intervals where knock sensors are sampled may be adjusted for the total number of deactivated cylinders. For example, if the engine is an eight cylinder engine and two cylinders are deactivated during an engine cycle, then eight angular intervals where knock sensor output is sampled may be provided, but timing of two of the eight angular intervals may be adjusted to different timings so that noise generated by noise sources may be isolated and characterized. Timing of the six other angular intervals where knock sensor output is sampled may remain unchanged so that the presence or absence of knock in activated cylinders may be determined. In this way, computational resources of the controller may be reallocated to characterize noise levels generated by engine noise sources. The characterized noise levels may then be the basis for determining the presence or absence of knock in engine cylinders.

Timing of knock windows 702a and 704a associated with deactivated cylinders 3 and 2 is adjusted as compared to base knock window timings that are shown in FIG. 7. This allows noise from closing of the port fuel injector shown at injection timing bar 715a to be determined via sampling a knock sensor during knock window 704a. Further, noise from closing of the port fuel injector shown at injection timing bar 717a may be determined via sampling a knock sensor during knock window 702a. Thus, it may be observed that the opening timing of knock window 704a is moved from an expansion stroke of cylinder number two into an exhaust stroke of cylinder number two or an intake stroke of cylinder number one. Further, it may be observed that the opening timing of knock window 702a is moved from an expansion stroke of cylinder number three into an intake stroke of cylinder number three or an intake stroke of cylinder number one. Thus, a knock window of a cylinder may be moved from an expansion or power stroke of a cylinder to a different stroke of the cylinder (e.g., intake, exhaust, compression) to detect and characterize a level of noise of an engine noise source. Output of a knock sensor is sampled and integrated in the new or shifted knock window to determine a noise level (e.g., Cyl_base_noise (j), Cyl_combined_noise (j), Cyl_inj_noise (j), Cyl_vlv_noise (j)) of the cylinder (j). The noise level may be applied not just to cylinder (j) to determine combined or total noise of the cylinder, but to other engine cylinders as well to determine combined noise levels for the other cylinders. For example, if cylinder j is cylinder number 3 and the value of Cyl_inj_noise (j) s 0.5, the injector noise for cylinder number two (Cyl_inj_noise (2)) may be adjusted to 0.5 based on the value of Cyl_inj_noise (j), where (j) is 3.

Additionally, in this example, the knock sensor sampled in knock window 702a is knock sensor 90d. However, when evaluating cylinder number three for knock, knock sensor 90b is sampled during knock window 702 as shown in FIG. 7. Similarly, the knock sensor sampled in knock window 704a is knock sensor 90c. However, when evaluating cylinder number two for knock, knock sensor 90a is sampled during knock window 704 as shown in FIG. 7. By changing which knock sensor is sampled in the knock window associated with the deactivated cylinder or that replaces the knock window of the deactivated cylinder, it may be possible to improve a signal to noise ratio for detecting a noise level of a particular engine noise source (e.g., fuel injectors, poppet valves, etc.). Consequently, the estimates of noise levels (e.g., Cyl_base_noise (j), Cyl_combined_noise (j), Cyl_inj_noise (j), Cyl_vlv_noise (j)) may be improved.

FIG. 9 also shows direct injections 710-717 of FIG. 7 have been replaced by port injections 715a, 717a, 711a, and 713a when estimates of noise levels are determined via knock windows associated with deactivated cylinders or when crankshaft angular intervals where a knock sensor is sampled replace knock windows of deactivated cylinders. By switching to port fuel injection, noise from port injectors closing may be characterized. Further, noise from direct injectors may be eliminated to that engine knock background noise may be characterized without direct injectors operating so that contributions of noise sources may be better characterized.

In these ways, contributions to a total engine knock background noise level may be determined. The contributions may be determined via knock windows that are associated with the deactivated cylinder or via crankshaft angular intervals (e.g., between crankshaft angle 90 degrees and crankshaft angle 140 degrees) may be determined without disturbing engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   supplying fuel to a first engine cylinder and sampling output of a first knock sensor during a knock window of the first engine cylinder via a controller;
   ceasing fuel supply to the first engine cylinder via the controller; and
   adjusting open timing of the knock window of the first engine cylinder to span a timing of a closing of a device of a second engine cylinder and sampling output of a second knock sensor during the knock window via the controller while the fuel supply to the first engine cylinder is ceased.

2. The method of claim 1, further comprising generating an engine knock background noise level via the sampled output of the second knock sensor.

3. The method of claim 2, further comprising generating an indication of engine knock via the engine knock background noise level.

4. The method of claim 1, where the device is a port fuel injector, and where an engine is rotating when the fuel supply to the first engine cylinder is ceased.

5. The method of claim 1, where the device is a direct fuel injector.

6. The method of claim 1, where the device is a poppet valve.

7. The method of claim 6, where the poppet valve is an intake valve.

8. An engine operating method, comprising:
   ceasing fuel supply to an engine via a controller;
   adjusting timing of intake and exhaust poppet valves of cylinders of the engine such that the intake and exhaust poppet valves of the cylinders do not close while knock windows of the cylinders are open via the controller while the fuel supply to the engine is ceased; and
   sampling output of one or more knock sensors while the knock windows of the cylinders are open via the controller.

9. The method of claim 8, where the one or more knock sensors comprises four knock sensors, and where the four knock sensors are sampled during a cycle of the engine.

10. The method of claim 8, where the adjusting of the timing of the intake and exhaust poppet valves includes retarding opening of the exhaust poppet valves.

11. The method of claim 8, where the adjusting of the timing of the intake and exhaust poppet valves includes advancing closing of the exhaust poppet valves.

12. The method of claim 8, further comprising adjusting the timing of the intake and exhaust poppet valves of the cylinders such that the intake or exhaust poppet valves of at least one cylinder of the cylinders closes while at least one of the knock windows of the cylinders is open.

13. The method of claim 8, further comprising generating an engine knock base background noise level for each cylinder of the engine based on data gathered during the sampling of the output of the one or more knock sensors.

14. The method of claim 13, further comprising generating an indication of engine knock based on at least one of the engine knock base background noise levels.

* * * * *